(12) United States Patent
Grundei

(10) Patent No.: US 6,651,787 B2
(45) Date of Patent: Nov. 25, 2003

(54) VIBRATION DAMPER

(75) Inventor: Manfred Grundei, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/934,181

(22) Filed: Aug. 21, 2001

(65) Prior Publication Data
US 2002/0027051 A1 Mar. 7, 2002

(30) Foreign Application Priority Data
Aug. 23, 2000 (DE) .......................... 100 41 199

(51) Int. Cl.⁷ ................................................ F16F 9/49
(52) U.S. Cl. ............ 188/280; 188/322.15; 188/322.22; 267/64.15
(58) Field of Search ............... 188/332.15, 322.22, 188/280, 282.1–282.5, 317, 281; 267/64.15, 64.11, 64.13, 124, 126, 127, 128

(56) References Cited

U.S. PATENT DOCUMENTS

| | | | | |
|---|---|---|---|---|
| 4,671,392 A | * | 6/1987 | Wossner | 188/266.3 |
| 4,702,463 A | | 10/1987 | Krautkämer | |
| 5,184,702 A | | 2/1993 | Schulze et al. | 188/282 |
| 5,219,414 A | * | 6/1993 | Yamaoka | 188/284 |
| 5,228,640 A | | 7/1993 | Mouille | |
| 5,911,290 A | * | 6/1999 | Steed | 188/266.4 |
| 6,018,868 A | | 2/2000 | Asadi et al. | 29/888.04 |
| 6,129,005 A | | 10/2000 | Asadi et al. | 92/183 |
| 6,179,100 B1 | * | 1/2001 | Mintgen et al. | 188/282.1 |
| 6,311,961 B1 | * | 11/2001 | Julia | 188/313 |

FOREIGN PATENT DOCUMENTS

| | | |
|---|---|---|
| DE | 1 216 800 | 3/1964 |
| DE | 14 55 861 | 2/1965 |
| DE | 2 230 975 | 6/1972 |
| DE | 39 39 650 | 11/1989 |
| DE | 197 35 248 | 8/1997 |
| DE | 197 35 249 | 8/1997 |
| GB | 2 024 311 | 1/1980 |
| JP | 7-300010 | 11/1995 |
| JP | 8-132846 | 6/1996 |
| JP | 10-339345 | 12/1998 |

* cited by examiner

*Primary Examiner*—Pam Rodriguez
(74) *Attorney, Agent, or Firm*—Cohen, Pontani, Lieberman & Pavane

(57) ABSTRACT

A vibration damper includes a cylinder in which a piston rod is guided so as to be axially movable. A first piston is mounted stationary on the piston rod and a second piston is mounted so as to be displaceable axially on the rod against a spring force. The cylinder has a work space at the piston rod side, a work space remote of the piston rod, and a work space between the two pistons. Through-openings which are outfitted with valves control a connection between the work spaces. The second piston has at least one return spring on both sides, and the piston is mounted so as to be displaceable axially in two directions against the return springs.

20 Claims, 3 Drawing Sheets

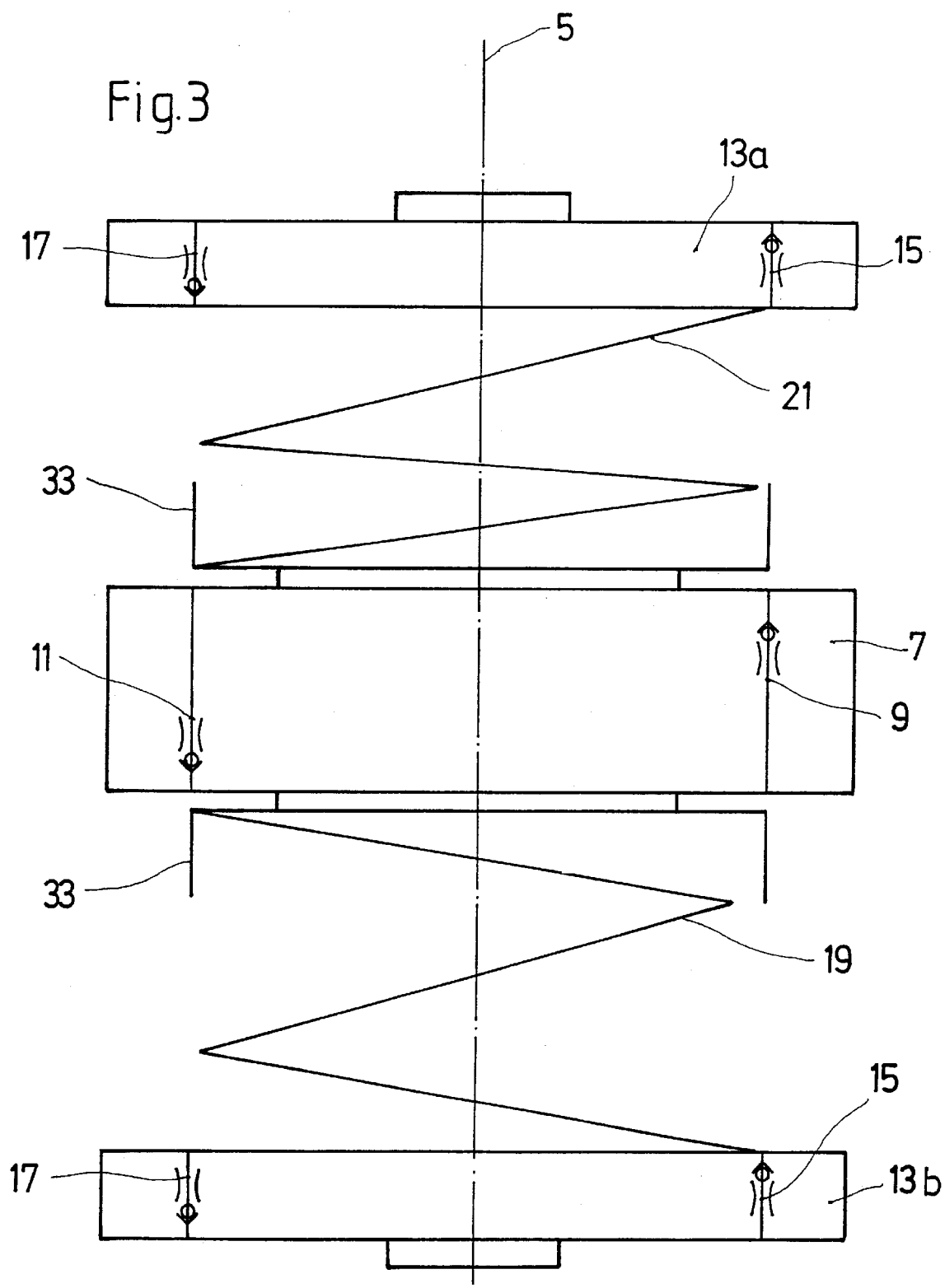

VIBRATION DAMPER

BACKGROUND OF THE INVENTION

1. Field of the Invention

The invention is directed to a vibration damper of the type wherein a piston rod moveable in a cylinder has a first piston mounted stationary thereon and a second piston axially displaceable on the piston rod against a spring force. The cylinder includes a piston rod side work space, a work space remote from the piston rod and a work space between the two pistons. The pistons are provided with valves for connecting the work spaces.

2. Description of the Related Art

DE-OS 22 30 975 discloses a vibration damper for motor vehicles which has a first stationary piston at a hollow piston rod and a second piston which is displaceable axially against a spring force. The two pistons have through-openings which are outfitted with check valves. The damping force of the vibration damper is generated by a central, double-action damping valve inside the piston rod. The check valves in the pistons serve only to provide damping medium to a work space between the two pistons when the second piston executes an axial movement and the piston distance and, therefore, said work space change.

DE 39 39 650 C2 discloses a hydraulic damper arrangement in which a piston is fastened in an axially springing manner to a piston rod. The piston rod is fastened at the wheel side and the cylinder of the damper arrangement is fastened on the body side, so that the piston can act as a damper. A problem in a damper arrangement of this kind consists in that clearly audible operating noises occur.

SUMMARY OF THE INVENTION

It is the object of the present invention to provide a vibration damper which offers advantages with respect to comfort compared to a conventional vibration damper during high-frequency excitations.

According to the invention, this object is met in that in a first embodiment the second piston has at least one restoring spring or return spring on both sides and the piston is mounted so as to be displaceable axially in two directions against the return springs.

Compared to the prior art mentioned above, a reduction in damping force can be achieved for the moving in direction and for the moving out direction of the piston rod, so that a noticeable increase in comfort can be achieved.

In an alternate version, a second and third axially displaceable piston are associated with the stationary piston, wherein the second and third piston are pretensioned in their normal position by at least one return spring.

The advantage of the second solution compared with the first consists in that the spring rates of the return springs are not cumulative and accordingly the possibilities for optimal design of the damper force characteristics of the vibration damper are further improved.

It is provided that the through-openings in the pistons for both through-flow directions are outfitted with damping valves. The great advantage to this consists in that a hollow piston rod for a damping valve can be dispensed with. The piston which is stationary relative to the piston rod provides for basic damping with its damping valves. The additional damping of the axially movable piston is superimposed cumulatively on this basic damping.

In another advantageous construction, a damping force adjuster controls the effective cross section of at least one through-opening depending on the instantaneous position of the movable piston. With a damping force adjuster of this type, an effect like that of a rebound stop or compression stop can be achieved for the piston rod regardless of the stroke position of the piston rod.

In this connection, the through-openings controlled by the damping force adjuster have valve disks which at least partially cover the through-openings in their basic position, wherein the damping force adjuster controls the valve disk movement proceeding from a defined piston position of the movable piston.

Accordingly, it is provided that the damping force adjuster is constructed as a stop which is stationary relative to the piston rod.

The stop is formed by a spring plate for a return spring so that the fewest possible structural component parts are needed for the pistons. Insofar as the first piston has a supporting disk for at least one valve disk, this supporting disk can form the spring plate for a return spring of the second piston.

At least one of the spring plates on which the return springs are supported is mounted so as to be axially movable so that the return springs can be adapted to different damping force characteristics in the simplest manner possible.

In addition, a hydraulic end stop can be provided for the piston rod movement in that the vibration damper has a stop spring which enters into an operative connection with the axially movable spring plate proceeding from a defined or predetermined stroke position of the piston rod.

When the vibration damper is designed for good suppression of rolling, the damping action of a damping valve on or associated with the moving or second piston and the return spring which is associated with the through-flow direction of the damping valve are adapted to one another in such a way that the movable piston is still mounted in a springing manner even with damping force above a defined piston rod movement speed.

It can also be provided in addition that the piston rod of the vibration damper is connected on the wheel side and the cylinder is connected on the body side and the movable piston is dimensioned as an added mass. The movable piston damps in a frequency-dependent manner, whereas the first piston ensures that no damping noises occur.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 3 shows an alternative construction to FIG. 1.

DETAILED DESCRIPTION OF THE PRESENTLY PREFERRED EMBODIMENTS

Figure 1:
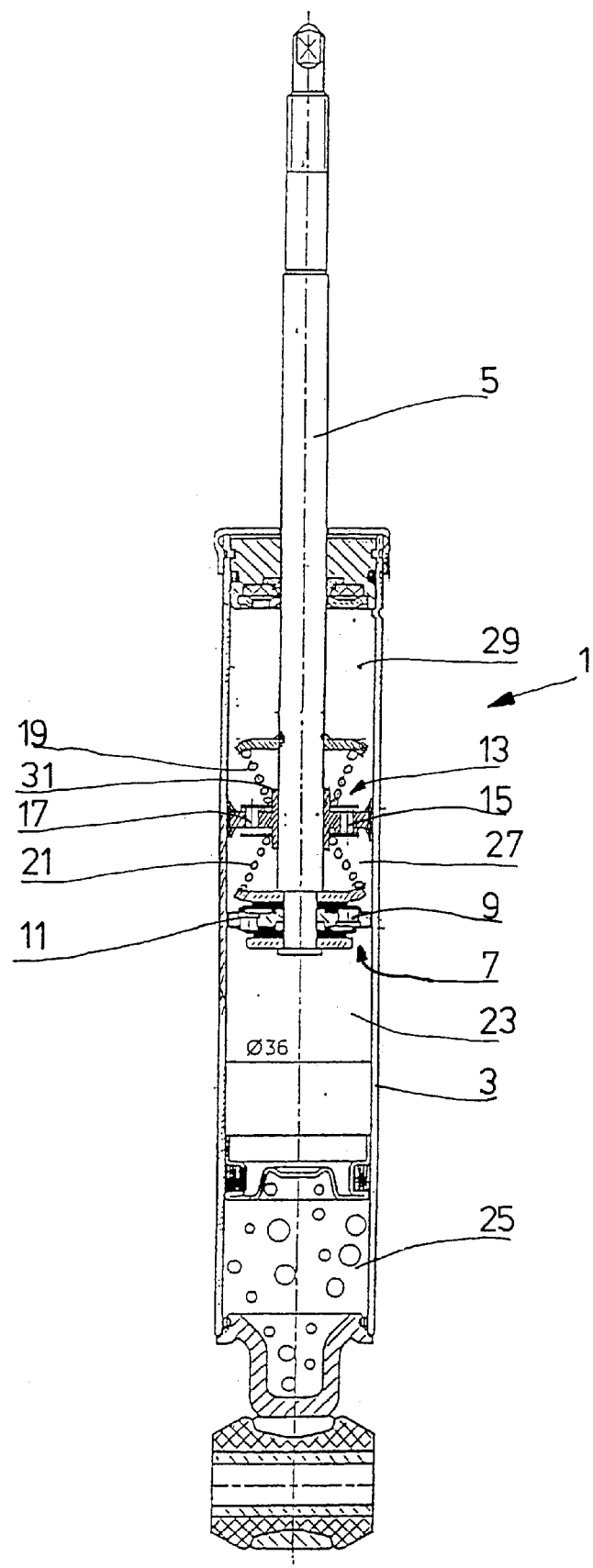
FIG. 1 shows a vibration damper in mono-tube construction with an axially movable piston.

FIG. 1 shows a vibration damper 1 in mono-tube construction which has a cylinder 3 in which a piston rod 5 is guided so as to be movable axially. In principle, the invention is not limited to use in a mono-tube vibration damper.

A first piston 7 is arranged in a stationary manner at the piston rod 5. The piston has through-openings which are outfitted with damping valves 9; 11. A piston of this kind is known, for example, from DE 197 35 249 C1 or DE 197 35 248 C1 and the contents of these two patents make up part of this specification with respect to the construction of the first piston.

In addition to the stationary first piston 7, a second axially movable piston 13 is arranged at the piston rod 5. With respect to its damping valves 15; 17, the construction of the second piston 13 substantially corresponds to that of the first piston 7. Two return springs 19; 21 hold the second piston 13 in a normal position when the piston rod is stationary.

The cylinder has a total of three work spaces. A first work space 23 remote of the piston rod extends from a compensation space 25 to the stationary piston 5. There is a second work space 27 between the two pistons. The second piston 13 defines a work space 29 on the piston rod side. All of the work spaces are filled with a damping medium.

When the piston rod moves out, an impact pressure builds up in front of the damping valve 15 in work space 29. A small, permanently open pre-opening cross section, not shown, allows damping medium to pass from work space 29 to work space 27. Depending on the speed of the moving out piston rod and the impact pressure in the work space 29 in this connection, the second piston 13 moves against the force of the return spring 21 in the direction of the first, stationary piston 7. The distance between the two pistons is accordingly reduced and the work space 27 decreases to the same extent, wherein damping medium flows at least through a pre-opening cross section (also not shown) of the damping valve 9. Depending on the piston rod stroke, the return spring 21 can bottom or a guide sleeve 31 of the second piston 13 is supported on the first piston. With small, high-frequency lifting, e.g., when driving over a cobblestone street, the second piston 13 acts only with its pre-opening cross section because of its axial movability. However, the return spring and damping valves 15; 17 can also be designed in such a way that they have only a very small pre-opening cross section and are designed as a whole for large damping forces, so that there is only an exchange of damping medium between the work spaces 27 and 23 during the excitation described above. When it is imagined that the damping medium is incompressible and the damping valve 15 is completely closed in the extreme case, only the first piston generates a damping force with its damping valve 9. The piston rod moves together with the first piston relative to the stationary second piston which is supported at the column of damping medium in the work space 29.

This achieves an effect as if the return spring 21 were a rebound stop spring supported at a stationary stop, e.g., of a piston rod guide. In this case, the sum of the damping force of the first piston and a spring force of the return spring 21 are measurable. In a vehicle with at least one vibration damper per wheel and axle, an effect takes place whereby, during a rolling movement of the vehicle about its longitudinal axis, there is a piston rod moving out at one side of the vehicle and a piston rod moving in at the other side of the vehicle at identical stroke speed. When the piston rod is suspended by the return spring 21 during a very fast outward movement of one vibration damper of the second piston, then the piston rod moving in at the other side of the vehicle is suspended by return spring 19. Both spring forces of the return springs 19; 21 present a moment which acts against the rolling moment and the vehicle tends to move back in the horizontal position. This action can also be utilized between the vibration dampers of the front axle and the rear axle of a vehicle during brake diving and start diving.

With greater piston rod strokes in connection with a lower piston rod speed, the second piston moves up to a stop which is determined by the block lengths of the return springs or guide sleeve 31. The damping valves 15, 17 of the second piston and the damping valves 9; 11 of the first piston open depending on the piston rod speed.

With respect to the return springs, it is noted in addition that spring assemblies or progressive springs can also be used so that there is no need for a noticeable stop of the second piston. Further, the spring rate of the two return springs 19; 21 is calculated from the sum of the individual spring rates. Thus, there is a dependence of the two return springs for the two axial movement directions of the second piston 13.

Figures 2A, 2B:
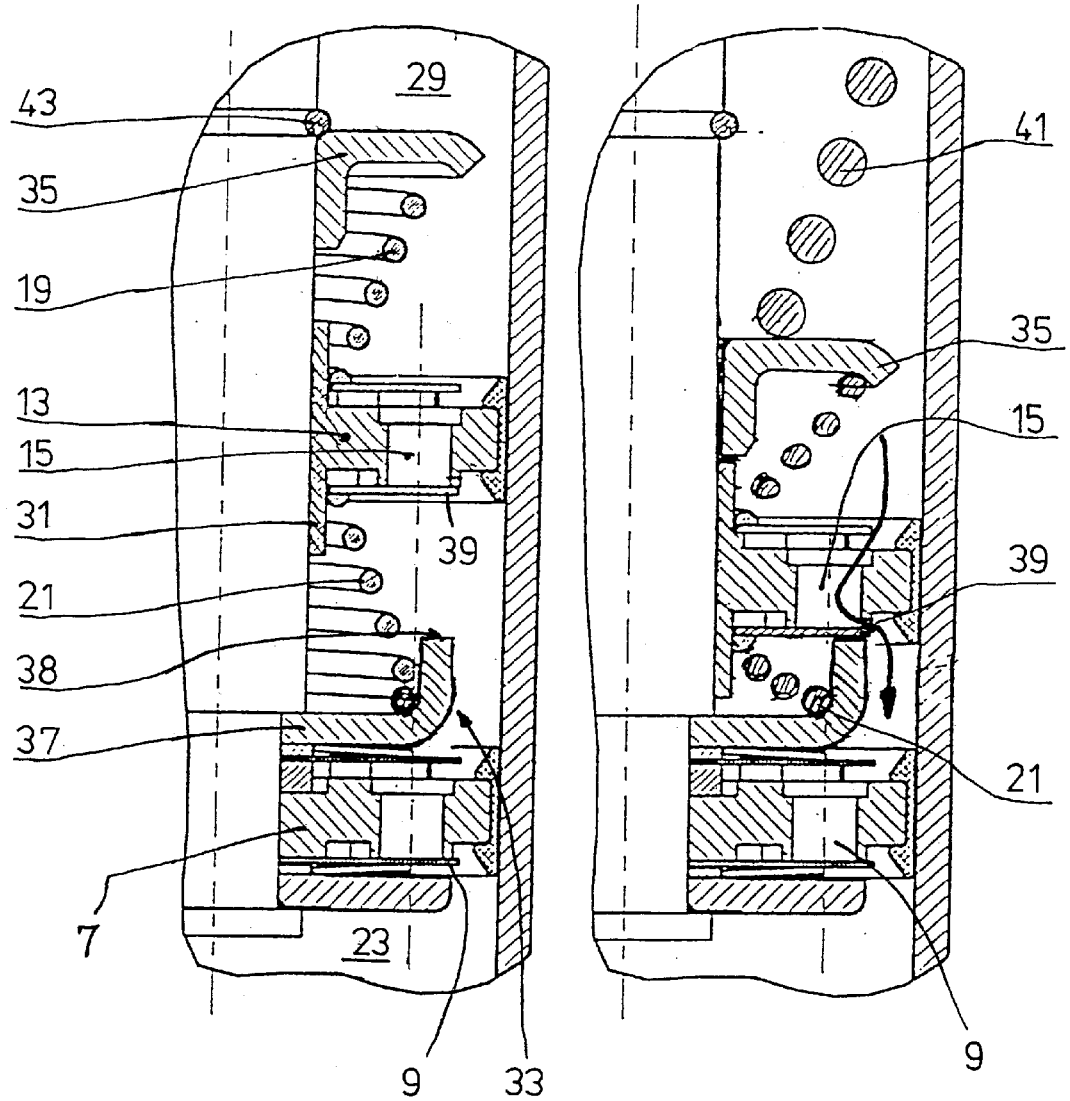
FIGS. 2a and 2b show a detail from FIG. 1.

FIGS. 2a and 2b show the first and second pistons of FIG. 1 in detail. A damping force adjuster 33 is used in addition. Further, a spring plate 35 for the return spring 19 is mounted so as to be movable axial to the piston rod.

The damping force adjuster is part of a supporting disk 37 of the piston 7, this supporting disk forming a spring plate for the return spring 21. A circumferentially extending edge of the spring plate constitutes a stop 38 which acts on at least one valve disk 39 of the damping valve 15 and controls the effective cross-sectional area of the through-opening by limiting the downstroke path of the valve disk 39. Accordingly, an additional increase in damping force is achieved when the second piston 13 has reached its maximum end position in the direction of the first piston.

In addition, the vibration damper can have a stop spring 41 which enters into a working connection with the spring plate 35 depending on the stroke position of the piston rod. The spring force of the stop spring 41 is greater than the force of the return spring 19, so that the second piston 13 with its damping valve 15 is displaced in the direction of the damping force adjuster 33. In addition to the mechanical supporting force of the stop spring, an increased hydraulic damping force is achieved without having to use a separate hydraulic-mechanical stop.

Adjusting sleeves can be arranged between the spring plate 35 and a retaining ring 43 in order to increase the spring forces of the return springs by means of increased pretensioning.

FIG. 3 shows a modification in relation to FIG. 1. It has already been explained that the return springs are in a dependent relationship with respect to the total spring rate because the total spring rate results as a sum of the individual spring rates of the return springs. However, applications can be imagined in which, e.g., the damping force should be very much greater in the moving out direction of the piston rod than in the moving in direction. Of course, this can also be achieved by means of outfitting the damping valves 9; 11, 15 and 17.

As is shown in FIG. 3, two axially movable pistons 13*a* and 13*b* can also be used, each of which has a return spring 19; 21 which is independent from the other respective return spring with respect to spring force or, when a plurality of return springs are used, independent from the other respective spring assembly. Otherwise, there is no difference in terms of operation between this and the construction according to FIG. 1. In addition, it is possible that a stop spring 41 causes a displacement of the pistons 13*a* or 13*b* in the moving in and moving out direction and a damping force adjuster 33 is effective for the damping valves 15; 17.

It is possible that the piston rod is connected on the wheel side in a motor vehicle. In that case, the axially movable piston can be used as a vibrating mass. The stationary first piston takes over the basic damping so that no damping noises occur.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A vibration damper, comprising:
   a cylinder;
   a piston rod axially moveable in said cylinder;
   a first piston mounted stationary on the piston rod;
   a second piston mounted on said piston rod and axially displaceable on said piston rod, the cylinder having a piston rod side first work space, a second work space remote from said piston rod side, and a third work space between said first and second pistons, said first and second pistons having through openings for connecting said work spaces; and
   a return spring at each of opposite sides of said second piston, said second piston being axially displaceable in each of opposite directions on said piston rod against the return springs.

2. A vibration damper according to claim 1, wherein said pistons carry damping valves for controlling the through flow openings.

3. A vibration damper according to claim 2, further comprising a damping force adjuster for controlling an effective cross section of at least one of the through openings depending on an instantaneous position of said displaceable piston.

4. A vibration damper according to claim 3, wherein the damping force adjuster controlling said at least one through opening includes a valve disk at least partially covering said at least one through opening, the damping force adjuster controlling valve disk movement at a predetermined positioning of the displaceable piston.

5. A vibration damper according to claim 3, wherein the damping force adjuster comprises a stop, said stop being stationary relative to said piston rod.

6. A vibration damper according to claim 5, wherein the stop comprises a spring plate on which one of the return springs is mountable.

7. A vibration damper according to claim 1, wherein at least one of said return springs is supported on a spring plate, said spring plate being mounted so as to be moveable axially of said piston rod.

8. A vibration damper according to claim 7, further comprising a stop spring, said stop spring operatively engaging said spring plate when said piston rod is at a predetermined stroke position.

9. A vibration damper according to claim 1, wherein said first piston includes a supporting disk for at least one valve disk, said supporting disk comprising a spring plate for a second piston return spring.

10. A vibration damper according to claim 1, wherein damping action of a damping valve associated with said second piston and a return spring associated with a given through-flow direction of said damping valve are adapted one with another such that the second piston remains under spring bias when damping force is above a predetermined piston movement speed.

11. A vibration damper according to claim 1, wherein the piston rod is connectable to a vehicle wheel side and the cylinder is connectable to a vehicle body side, the second piston being dimensioned as an added mass.

12. A vibration damper, comprising:
    a cylinder;
    a piston rod axially moveable in said cylinder;
    a first piston mounted stationary on the piston rod;
    a second piston mounted on said piston rod and axially displaceable on said piston rod, the cylinder having a piston rod side first work space, a second work space remote from said piston rod side, and a third work space between said first and second pistons, said first and second pistons having through openings for connecting said work spaces; and
    a third piston axially displaceable on said piston rod, the second and third pistons being located at each of opposite sides of said first piston, said second and third pistons being pretensioned in a normal position with at least one return spring.

13. A vibration damper according to claim 12, wherein each of said first, second and third pistons carry damping valves for controlling the through flow openings.

14. A vibration damper according to claim 13, further comprising a damping force adjuster for controlling an effective cross section of at least one of the through openings depending on an instantaneous position of one of said displaceable pistons.

15. A vibration damper according to claim 14, wherein the damping force adjuster controlling said at least one through opening includes a valve disk at least partially covering said at least one through opening, the damping force adjuster controlling valve disk movement at a predetermined positioning of one of the displaceable pistons.

16. A vibration damper according to claim 14, wherein the damping force adjuster comprises a stop, said stop being stationary relative to said piston rod.

17. A vibration damper according to claim 16, wherein the stop comprises a spring plate on which one the at least one return spring is mountable.

18. A vibration damper according to claim 12, wherein said first piston includes a supporting disk for at least one valve disk, said supporting disk comprising a spring plate for a second piston return spring.

19. A vibration damper according to claim 12, wherein damping action of a damping valve associated with said second piston and a return spring associated with a given through-flow direction of said damping valve are adapted one with another such that the second piston remains under spring bias when damping force is above a predetermined piston movement speed.

20. A vibration damper according to claim 12, wherein the piston rod is connectable to a vehicle wheel side and the cylinder is connectable to a vehicle body side, the second piston being dimensioned as an added mass.

\* \* \* \* \*